(12) United States Patent
Sloan

(10) Patent No.: US 7,663,641 B2
(45) Date of Patent: Feb. 16, 2010

(54) GAMUT MAPPING UTILIZING CUSP POINTS AND THREE-DIMENSIONAL BOUNDARY SURFACES

(75) Inventor: Rocklin J. Sloan, San Jose, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 442 days.

(21) Appl. No.: 11/396,693

(22) Filed: Apr. 4, 2006

(65) Prior Publication Data

US 2006/0221396 A1 Oct. 5, 2006

Related U.S. Application Data

(63) Continuation-in-part of application No. 10/840,564, filed on May 6, 2004.

(51) Int. Cl.
  G09G 5/02 (2006.01)
  H04N 1/60 (2006.01)
  G03F 3/08 (2006.01)

(52) U.S. Cl. .................. 345/590; 345/589; 345/591; 345/604; 348/674; 358/1.9; 358/3.01; 358/518; 358/520; 382/162; 382/167

(58) Field of Classification Search .......... 345/603, 345/418, 589–591, 597, 600–601, 604; 348/674, 348/692; 358/518–520, 1.9, 3.01, 3.24; 382/162–167
  See application file for complete search history.

(56) References Cited

U.S. PATENT DOCUMENTS 5,083,344 A * 1/1992 Pettit et al. ............. 16/254
5,452,017 A   9/1995 Hickman
5,611,030 A * 3/1997 Stokes ................... 345/590
5,903,275 A * 5/1999 Guay .................... 345/590

(Continued)

OTHER PUBLICATIONS

G.J. Braun, et al., "Gamut Mapping for Pictorial Imates", Rochester Institute of Technology, Rochester, N. Y. (Cited in U.S. Appl. No. 10/840,564 and copy provided therein).

(Continued)

*Primary Examiner*—Wesner Sajous
(74) *Attorney, Agent, or Firm*—Fitzpatrick, Cella, Harper & Scinto

(57) ABSTRACT

Gamut-mapping from a source device to a destination device is performed in a perceptually linear color space such as CIECAM02 by separating a source image into primary color components and processing each primary component separately by mapping a source cusp point with a destination cusp point. The mapped primary components are then summed and a resultant destination image is obtained. Alternatively, hue rotation is performed by determining a relative position of an input color between the nearest primary and the nearest secondary color in a source hue wheel. The determined relative position in the source hue wheel is used to find a corresponding location in a destination hue wheel so that a hue angle for the destination point can be obtained. In either process, the source and destination points are mapped using a cusp-to-cusp mapping process, and if the source point lies outside of the destination boundary after the cusp mapping, the point is mapped to the three-dimensional surface of the destination gamut. Finally, results of the mapping process are converted from device-independent color appearance space values to tristimulus values, and from tristimulus values to a color space of the destination device.

18 Claims, 15 Drawing Sheets

U.S. PATENT DOCUMENTS

| | | | |
|---|---|---|---|
| 5,963,201 A * | 10/1999 | McGreggor et al. | 715/722 |
| 6,147,772 A | 11/2000 | Pritchett | |
| 6,297,826 B1 * | 10/2001 | Semba et al. | 345/589 |
| 6,539,110 B2 | 3/2003 | Myers | |
| 6,594,388 B1 | 7/2003 | Gindele et al. | |
| 6,611,356 B1 | 8/2003 | Shimizu et al. | |
| 6,618,499 B1 * | 9/2003 | Kohler et al. | 382/162 |
| 6,719,392 B2 * | 4/2004 | Qiao | 347/15 |
| 6,720,973 B2 | 4/2004 | Butler | |
| 6,765,586 B2 * | 7/2004 | Yamazaki et al. | 345/590 |
| 6,833,937 B1 | 12/2004 | Cholewo | |
| 6,995,865 B1 * | 2/2006 | Motomura | 358/1.9 |
| 7,071,965 B2 | 7/2006 | Baker | |
| 7,379,208 B2 | 5/2008 | Henley et al. | |
| 2003/0072016 A1 * | 4/2003 | Dalrymple et al. | 358/1.9 |
| 2003/0117457 A1 | 6/2003 | Qiao | |
| 2003/0138142 A1 * | 7/2003 | Hung | 382/162 |
| 2003/0234793 A1 | 12/2003 | Stokes et al. | |
| 2004/0086176 A1 * | 5/2004 | Meier et al. | 382/162 |
| 2004/0136014 A1 | 7/2004 | Maltz | |
| 2005/0073730 A1 * | 4/2005 | Huang et al. | 358/518 |
| 2005/0083344 A1 | 4/2005 | Higgins | |
| 2005/0248784 A1 * | 11/2005 | Henley et al. | 358/1.9 |
| 2005/0248785 A1 * | 11/2005 | Henley et al. | 358/1.9 |
| 2006/0007460 A1 * | 1/2006 | Bogdanowicz et al. | 358/1.9 |
| 2006/0274211 A1 | 12/2006 | White | |

OTHER PUBLICATIONS

E.D. Montag, et al., "Gamut Mapping: Evaluation of Chroma Clipping Techniques for Three Destination Gamuts", The Sixth Color Imaging Conference: Color Science, Systems, and Applications, Rochester Institute of Technology, pp. 57-81 (Cited in U.S. Appl. No. 10/840,564 and copy provided therein).

G. Marcu, "Gamut Mapping in Munsell Constant Hue Sections", The Sixth Color Imaging Conference : Color, Science, Systems, and Applications, pp. 159-162. (Cited in U.S. Appl. No. 10/840,564 and copy provided therein).

R. Kimmel, et al., "Space Sensitive Color Gamut Mapping: A Variational Approach", HP Laboratories, Hewlett-Packard Company 2002, pp. 1-14 (Cited in U.S. Appl. No. 10/840,564 and copy provided therein).

J. Morovic, et al., "The Fundamentals of Gamut Mapping: A Survey", Journal of Imaging Science and Technology, Society for Imaging Science and Technology, vol. 45, No. 3, pp. 283-290, Springfield, May-Jun. 2001 (Cited in U.S. Appl. No. 10/840,564 and copy provided therein).

"Color Gamut and Gamut Mapping", <http://www.wasatchinc.com/digigrafix.gamut.html> visited Apr. 1, 2004. (Cited in U.S. Appl. No. 10/840,564).

"Monitor Calibration and Profiling", <http://www.drycreekphoto.com/Learn/monitor_calibration.html>, visited Apr. 2, 2004. (Cited in U.S. Appl. No. 10/840,564 and copy provided therein).

* cited by examiner

BEFORE LIGHTNESS RESCALING

AFTER LIGHTNESS RESCALING

GAMUT MAPPING UTILIZING CUSP POINTS AND THREE-DIMENSIONAL BOUNDARY SURFACES

INCORPORATION BY REFERENCE

This application is a continuation-in-part of application Ser. No. 10/840,564, filed on May 6, 2004, entitled "Gamut Mapping With Primary Color Rotation," the contents of which are hereby incorporated by reference as if set forth in full herein.

BACKGROUND OF THE INVENTION

1. Field of the Invention

The present invention relates to gamut mapping processes. In more detail, the present invention provides a gamut mapping process that separates a source image into primary colors and processes each primary component separately, and a process that utilizes hue rotation, whereby mapping is performed by mapping a source cusp to a destination cusp point and performing a final clipping the destination gamut surface, if needed.

2. Description of the Related Art

Gamut mapping relates to image reproduction from one imaging device to another, such as reproducing an image displayed on a color monitor as a printed image printed by a color printer. To reproduce the image, the color gamut (a range of producible colors) of a source device (such as the color monitor) needs to be mapped to the color gamut of a destination device (such as the printer).

Typically, the color gamut of the source device is larger than the color gamut of a destination device and therefore, it is necessary to compress colors of the source device that are outside of the color gamut of the destination device so that these out-of-gamut colors can be reproduced by the destination device. Thus, it is often necessary to map colors between two devices that have different sized gamuts, where one device may have a large gamut and the other a small gamut. For example, it may be necessary to map colors from a color monitor that uses a large color space, such as Adobe RGB color space, to a printer that uses a smaller color space, such as sRGB color space.

Various techniques have been utilized in performing gamut mapping so as to reproduce colors as accurately as possible. For example, many conventional gamut mapping algorithms aim to produce calorimetrically accurate data, but this type of conversion often results in dull colors being produced by a printer. Thus, while the data produced by these conventional algorithms may be colorimetrically accurate, the printed result is an unappealing, dull printout. This problem can be particularly noticeable when printing business graphics images in which a user may want to produce bright, vivid colors.

SUMMARY OF THE INVENTION

The present invention addresses the foregoing by maintaining hue saturation so that bright, vivid colors can be output by a destination device at the expense of accuracy, if necessary. In one aspect, the invention performs gamut-mapping from a source device to a destination device in a perceptually linear color space (for example, CIECAM02) by separating a source image into primary color components (RGB components) and processing each primary color component separately. In this aspect, primary hue leafs are obtained from the source and destination gamuts and are used in mapping each respective primary component of the source image to the destination. The resultant mapping for each respective primary component is converted back to respective primary component XYZ values, which are then summed to obtain XYZ values of the destination image. As a result, although the image may be separated into primary components, the mapping can be performed in the color appearance space (CIECAM02, for example), while providing a pleasant destination image.

Thus, in one aspect the invention performs gamut-mapping from a source device to a destination device in a perceptually linear color space, by separating a source image into primary color components, determining tristimulus values for each of the separated primary color components, and converting the tristimulus values for each primary color component into respective device-independent color appearance space values. Primary hue leafs for each primary color component for both a source gamut and a destination gamut are obtained, and a mapping process is performed on each primary component of the input image by mapping each corresponding primary component source hue leaf to fit within each respective primary color component destination hue leaf to map the input image to the destination. The results of the mapping process for each respective primary color component are converted from device-independent color appearance space values to tristimulus values, with the respective tristimulus values for each primary color component being summed to obtain resultant tristimulus values. Finally, the resultant tristimulus values are converted to a color space of the destination device to obtain a destination image.

In another aspect of the invention, hue rotation is performed in the mapping process so as to maintain a maximum level of hue saturation. In performing the mapping, a source hue wheel and a destination hue wheel are determined from the source and destination gamuts, respectively. From each hue wheel, the hue angle for each of the primary colors (RGB) and secondary colors (CMY) will be known. The input color's location on the source hue wheel is determined and the nearest primary and the nearest secondary color to the input color are determined. Then, the relative position of the input color between the two nearest colors is determined so that a corresponding relative position between the corresponding colors in the destination hue wheel can be determined. Having obtained the relative position in the destination hue wheel, the hue angle can be determined in the destination. Thus, a source hue leaf can be taken at the hue angle of the input color, while a hue leaf of the destination can be taken at the determined relative position. Therefore, the hue angles may not be the same, but the hue saturation can be maintained so that bright, vivid colors are produced in the destination device.

Therefore, in another aspect the invention performs gamut-mapping from a source device to a destination device in a perceptually linear color space by obtaining a source image, determining tristimulus values for the source image and converting the tristimulus values to device-independent color appearance space values, and obtaining a source hue wheel and a destination hue wheel each respectively comprising known hue angles for each of primary and secondary color components of their respective gamuts. A source hue angle of the source image in the source hue wheel is determined, and a source relative position of the source image in the source hue wheel between the nearest primary color and the nearest secondary color is determined. In the destination hue wheel, a corresponding relative position between the primary and secondary color corresponding to the nearest primary and secondary in the source hue wheel is determined so that the determined relative position in the destination hue wheel results in a destination hue angle. Then, a source hue leaf is obtained from the source gamut at the source hue angle, and a destination hue leaf is obtained from the destination gamut at the determined destination hue angle. Finally, a mapping process is performed between the obtained source hue leaf and the obtained destination hue leaf to fit the source hue leaf within the destination hue leaf, and results of the mapping process are converted from device-independent color appearance space values to tristimulus values, and the converted tristimulus values are converted to a color space of the destination device.

In yet another, related aspect of the invention, rather than utilizing hue leafs to perform the mapping process, the mapping process is performed by utilizing cusp points and the three-dimensional gamut surface to map the source point to the destination point. Therefore, the above-described processes of separating the source image into primary color components and processing each component separately, and/or utilizing hue rotation to obtain the destination hue angle, can also be employed with this additional aspect, but with the mapping process being performed differently.

Thus, in this additional aspect, the invention performs gamut-mapping of a source point for a source device to a destination point for a destination device in a perceptually linear color space by separating the source point into primary color components, determining tristimulus values for each of the separated primary color components, and converting the tristimulus values for each primary color component into respective device-independent color appearance space values. Then, for each primary color component a mapping process is performed by determining a source hue angle and a destination hue angle for the source point, obtaining a source cusp point representing a maximum chroma value on a source gamut boundary surface at the source hue angle, and obtaining a destination cusp point representing a maximum chroma value on a destination gamut boundary surface at the destination hue angle, and performing a cusp mapping process to map the source cusp point to the destination cusp point. If after the cusp mapping process, the source point lies outside of the destination gamut boundary surface, the source point is mapped to the destination gamut boundary surface. Finally, results of the mapping process for each respective primary color component are converted from device-independent color appearance space values to tristimulus values, the respective tristimulus values for each primary color component are summed to obtain a resultant tristimulus values, and the resultant tristimulus values are converted to a color space of the destination device to obtain a destination image.

Further, this additional aspect of the invention performs gamut-mapping of a source point for a source device to a destination point of a destination device in a perceptually linear color space by obtaining the source point for a source image, and determining tristimulus values for the source point and converting the tristimulus values to device-independent color appearance space values. A source hue wheel and a destination hue wheel each respectively comprising known hue angles for each of primary and secondary color components of their respective gamuts are obtained. From the obtained source wheel, a source hue angle of the source point in the source hue wheel is determined, and a source relative position of the source point in the source hue wheel between the nearest primary color and the nearest secondary color is determined. Likewise, in the destination hue wheel, a corresponding relative position between the primary and secondary color corresponding to the nearest primary and secondary in the source hue wheel is determined, and the relative position in the destination hue wheel is determined, resulting in a destination hue angle. Then, a source cusp point representing a maximum chroma value on a source gamut boundary surface at the source hue angle is obtained, and a destination cusp point representing a maximum chroma value on a destination gamut boundary surface at the destination hue angle is obtained, whereby a cusp mapping process is performed to map the source cusp point to the destination cusp point. If after the cusp mapping process, the source point lies outside of the destination gamut boundary surface, mapping the source point to the destination gamut boundary surface. Finally, results of the mapping process are converted from device-independent color appearance space values to tristimulus values, and the converted tristimulus values are converted to a color space of the destination device.

As a result of the foregoing, the source image can be processed in a gamut-mapping process that maintains a maximum level of hue saturation. As such, bright, vivid colors can be printed out by a printer or displayed by a destination monitor, particularly with regard to business graphics images.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
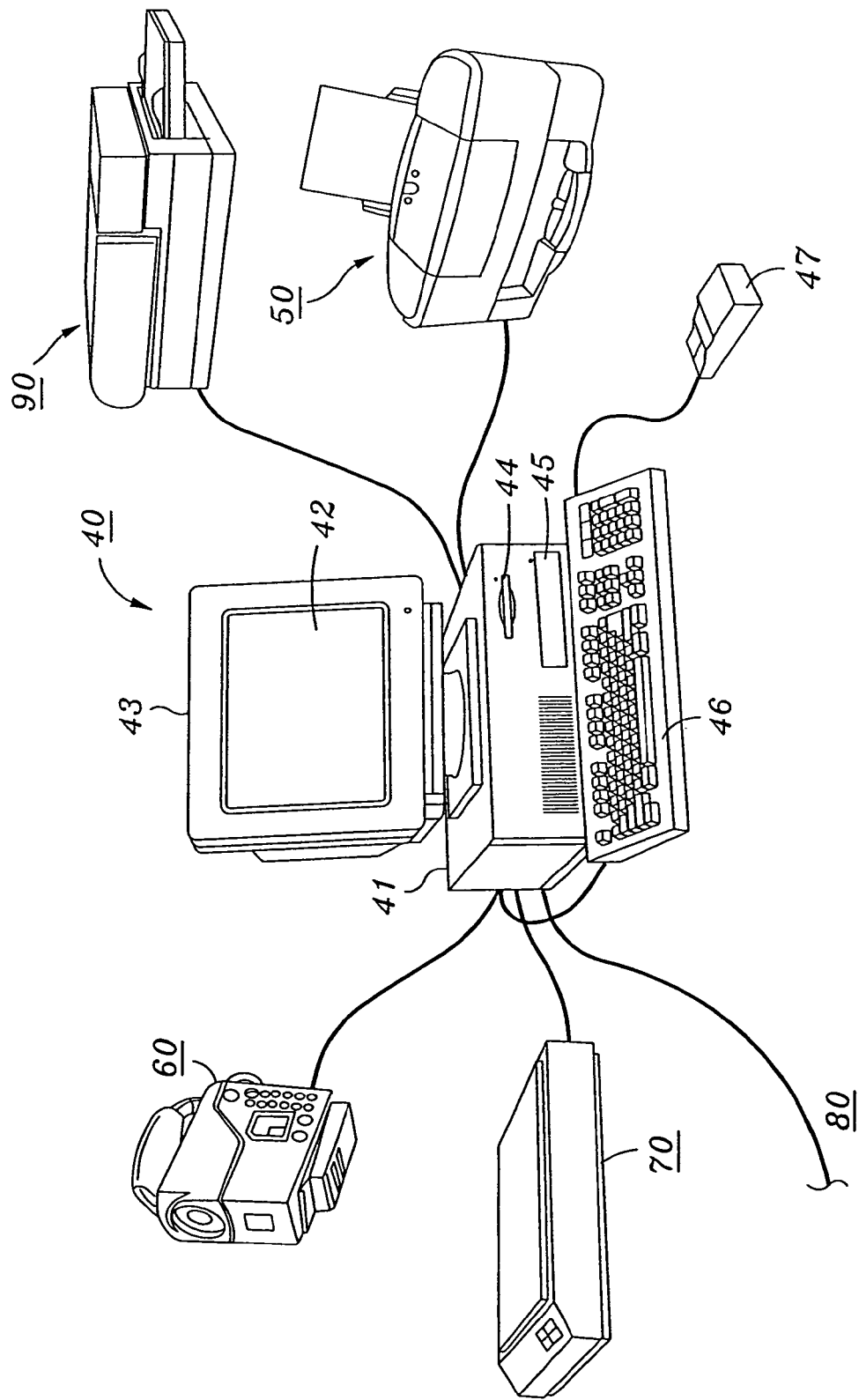
FIG. 1 is a representative view of a computer system in which iterative gamut mapping according to the invention may be implemented.

FIG. 1 depicts an example of a computing environment in which the present invention may be implemented. Computing equipment 40 includes host processor 41 which comprises a personal computer (hereinafter "PC"), preferably an IBM PC-compatible computer having a windowing environment such as Microsoft Windows 98, Windows 2000, Windows Me, Windows XP, or Windows NT, or other windowing system such as LINUX. Alternatively, host processor 41 may be an Apple computer or other non-windows based computer. Computing equipment 40 preferably includes color monitor 43 having a display screen 42, keyboard 46 for entering data and user commands, and pointing device 47, which preferably comprises a mouse for pointing to and for manipulating objects displayed on display screen 42.

Computing equipment 40 preferably also includes a computer-readable memory media such as fixed disk 45 and/or floppy disk drive 44. Floppy disk drive 44 provides a means whereby computing equipment 40 can access information, such as digital image data, computer-executable process steps, application programs, etc. stored on removable memory media. In the alternative, information can also be retrieved through other means such as a USB storage device connected to a USB port (not shown) of computer 40, or through network interface 80. Additionally, a CD-ROM drive and/or a DVD drive (not shown) may be included so that computing equipment 40 can access information stored on removable CD-ROM and DVD media.

Printer 50 as depicted in FIG. 1 is preferably a color bubble jet printer, which forms color images on a recording medium such as paper or transparencies or the like. Printer 90 as depicted in FIG. 1 is a different type of printer than printer 50, such as a color laser printer, which also forms color images on a recording medium such as paper or transparencies or the like. Preferably, printer 50 and printer 90 form color images using cyan, magenta, yellow and black inks, although the present invention can be used with printers and devices which use other colorant combinations. The invention is not limited to being used in conjunction with color printers, but may also be used with other device that use various colorant combinations, so long as they are capable of being interfaced to computing equipment 40. In addition, digital color scanner 70 is provided for scanning documents and images and sending the corresponding digital image data to computing equipment 40. Digital color camera 60 is also provided for sending digital image data to computing equipment 40. Of course, computing equipment 40 may acquire digital image data from other sources such as a digital video camera, a local area network or the Internet via network interface 80.

Figure 2:
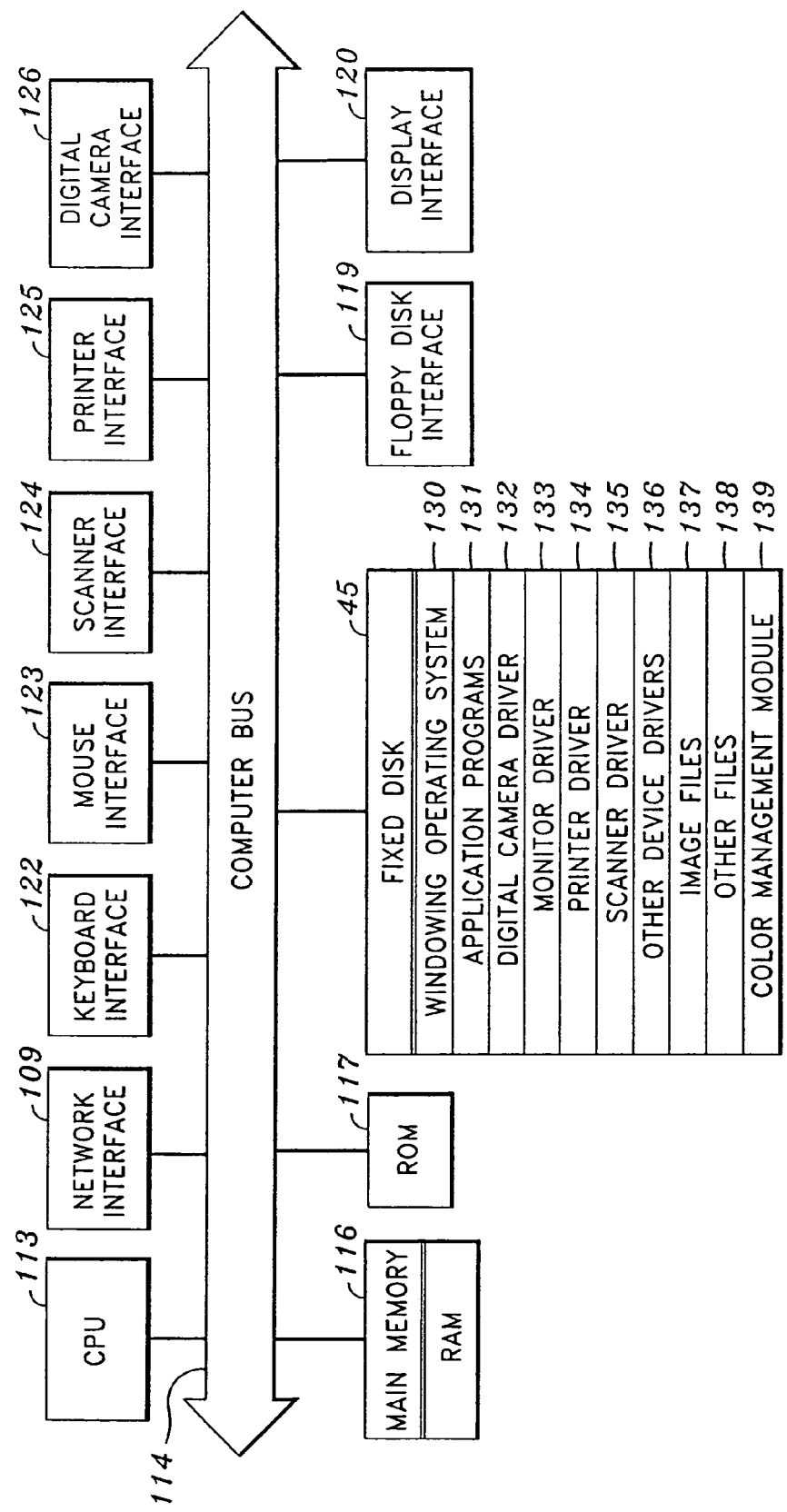
FIG. 2 is a detailed block diagram showing the internal architecture of the computer system shown in FIG. 1.

FIG. 2 is a detailed block diagram showing an example of the internal architecture of host processor 41 of computing equipment 40. As shown in FIG. 2, host processor 41 preferably includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printers 50 and 90, and digital camera interface 126 for digital camera 60.

RAM 116 interfaces with computer bus 114 so as to provide information stored in RAM 116 to CPU 113 during execution of software programs such as an operating system, application programs, such as color management module 142, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as digital color images or other information can be stored in RAM 116, so that the data can be accessed by CPU 113 during the execution of computer-executable process steps need to access and/or modify the data.

As also shown in FIG. 2, fixed disk 45 preferably contains operating system 130, which is preferably a windowing operating system although other operating systems may be used, and application programs 131, such as a word processing program or a graphic image management program. Fixed disk 45 also contains digital camera driver 132, monitor driver 133, printer driver 134, scanner driver 135, and other device drivers 136. Fixed disk 45 also includes image files 137, other files 138, and color management module 139 which is used to render source image color data (for example, an image displayed on display screen 42) for reproduction on a destination output device, such as printer 50. The color management module 139 will now be described in more detail.

Each device used to output images (e.g., monitors, printers, scanners, etc.) has a reproducible range of colors that it can produce. This range is known as the device's color gamut. Color gamuts differ between different devices, and in particular between different types of devices, as well as between different color spaces. For example, color printers typically have color gamuts that are different from those of color monitors. In addition, different types of color printers, such as ink jet printers and color laser printers, typically have very different color gamuts with respect to one another. Further, a device that uses the Adobe RGB color space has a different color gamut than a device that uses the sRGB color space.

Producible colors for images output by a system such as computer system 40 may fall within (i.e., inside the volume of) a color gamut for one image output device, such as monitor 42, but outside of a color gamut for another image output device, such as printer 50. Images displayed by computer 41 that are to be output to printer 50 often include colors outside of the color gamut for printer 50. In order for printer 50 to output an image that looks substantially the same as the image displayed by computer 41, the out-of-gamut colors must be mapped to colors that fall within the color gamut of printer 50.

Figure 3:
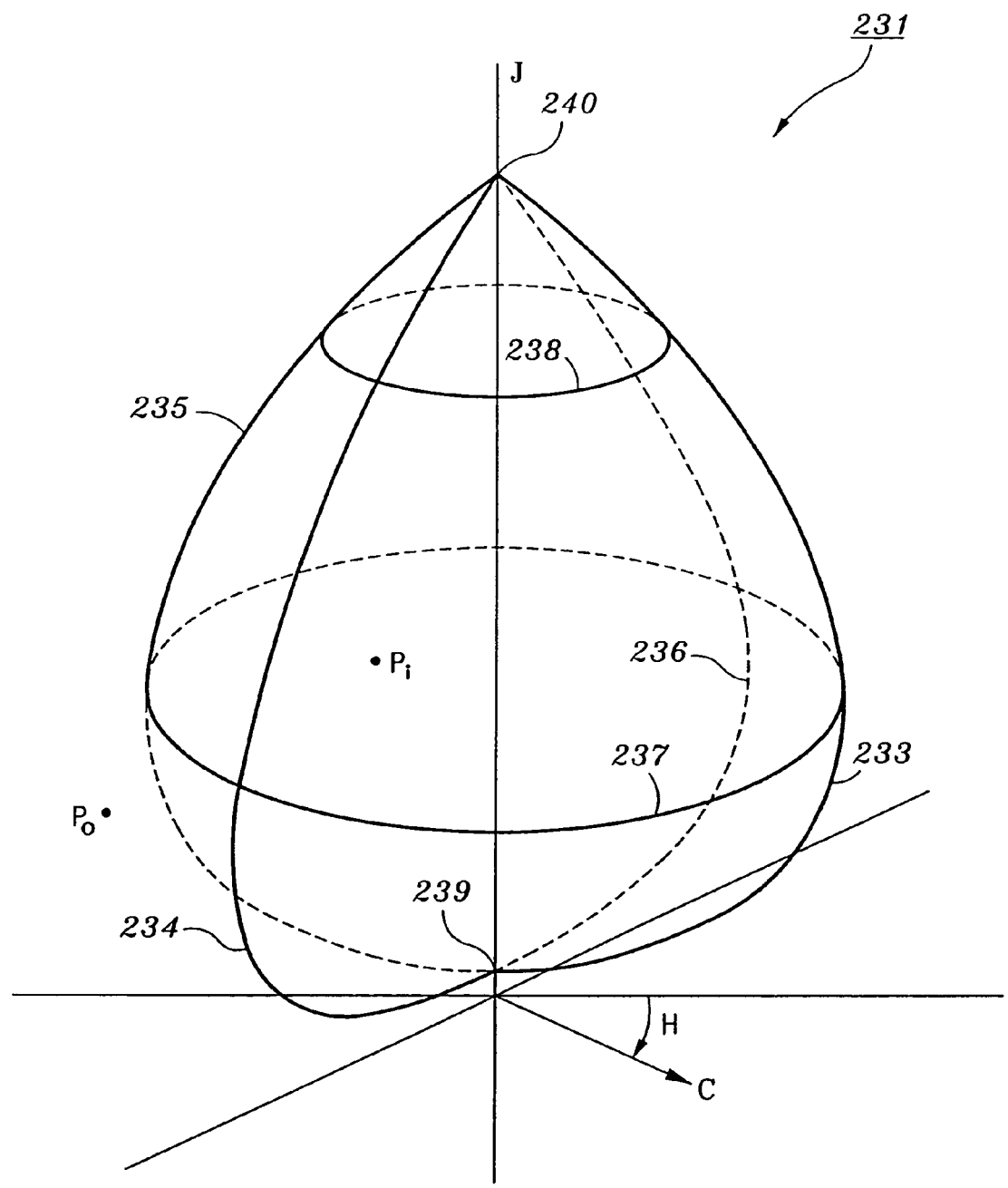
FIG. 3 is a representative view of a color gamut surface.

FIG. 3 is a representative view of a color gamut surface that may represent a color gamut of, for example, monitor 43 or printer 50. Colors represented by points enclosed by the color gamut surface fall within the color gamut of the device and therefore can be input or output by the device corresponding to the color gamut. Shown in FIG. 3 is color gamut surface 231 in three-dimensional Jch color space, which preferably corresponds to the CIECAM02 color space, although it could correspond to any color space. This three-dimensional color space is preferably defined by the following cylindrical coordinates: J, a scalar lightness value; h, a hue value in degrees; and c, a scalar chroma value. While the invention is preferably employed in conjunction with the CIECAM02 color space, it should be noted that the invention can be implemented in other color spaces, although perceptually linear color spaces are preferred. Also, the color gamut surface need not be mapped in a cylindrical color space.

In FIG. 3, color gamut surface 231 is illustrated by lines running along the color gamut surface. Line 233 runs along color gamut surface 231 at a hue value of 0 degrees; line 234 runs along color gamut surface 231 at a hue value of 90 degrees; line 235 runs along color gamut surface 231 at a hue value of 180 degrees; and line 236 runs along color gamut surface 231 at a hue value of 270 degrees. Lines 237 and 238 run along color gamut surface 231 at constant lightness values. On the lightness (J) axis, points on the color gamut surface for a zero chroma value overlap at points 239 and 240, which represent the black and white points, respectively, of the color gamut.

Color gamut surfaces typically are not symmetric. In fact, a color gamut surface typically includes at least some irregularly-shaped portions. Color gamut surface 231 in FIG. 3 therefore is shown as a non-symmetric surface. For example, the color gamut surface at line 233 for hue value 0 degree is shaped differently than the color gamut surface at line 235 for hue value 180 degree. Point $P_i$ in FIG. 3 falls within color gamut surface 231 and therefore, a color represented by point $P_i$ can be output by the device corresponding to color gamut surface 231. In contrast, point $P_o$ falls outside of the color gamut surface 231, indicating that a color represented by point $P_o$ cannot be output by that device.

Figure 4:
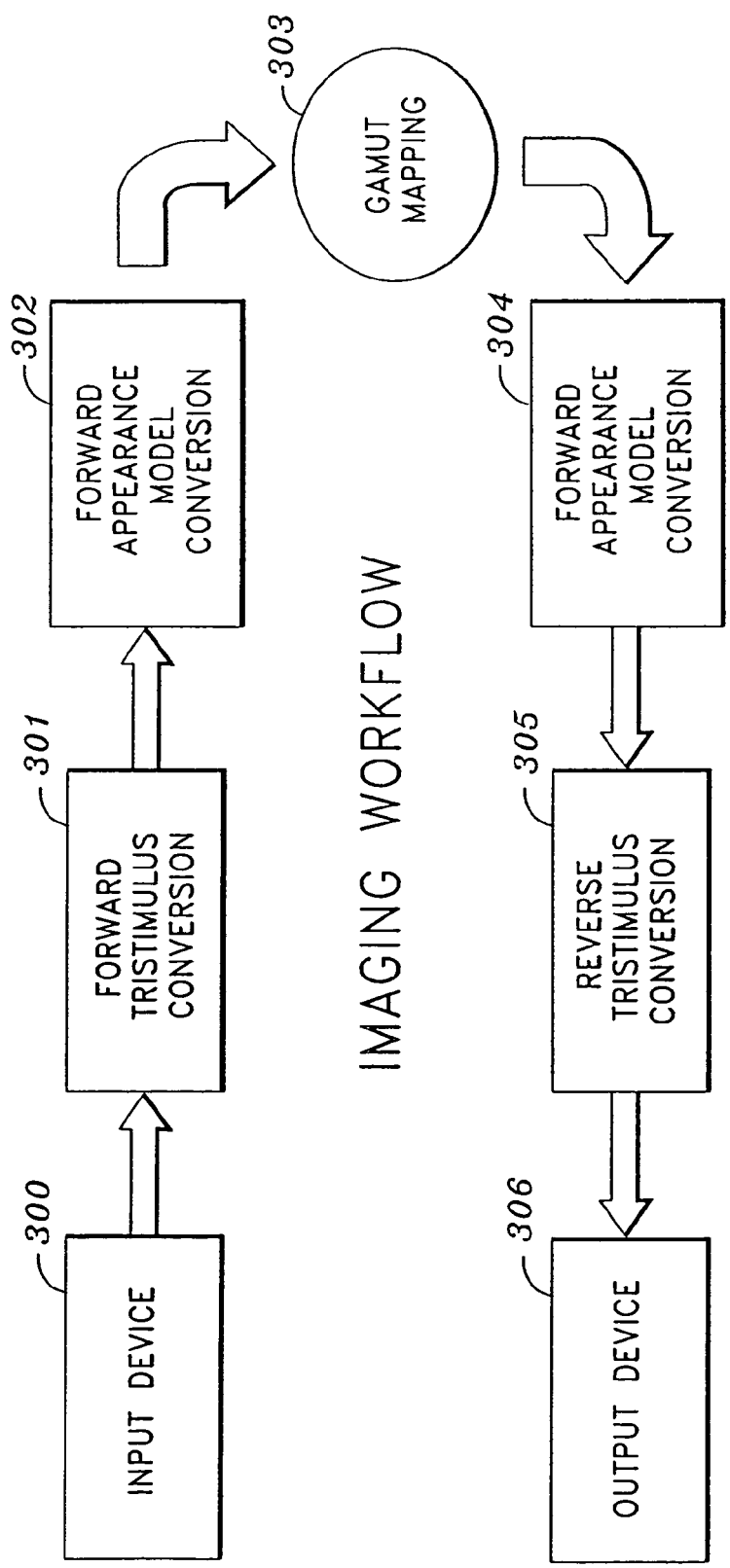
FIG. 4 depicts a high level example of a imaging workflow process according to the invention.

Referring now to FIG. 4, a basic workflow diagram for processing an image in a color management system is depicted. In general terms, an input device 300 (source device) and output device 306 (destination device) are characterized to represent their corresponding gamuts and are profiled by a profiler that generates measurement only profiles (MOPS). Two gamut boundary descriptors are generated using the generated profiles, one each for the source device gamut and the destination device gamut. The image is transformed from the input device-dependent space into a device-independent color appearance space (301 and 302), such as CIECAM02. Gamut mapping 303 is then performed on the image in the color appearance space (e.g., in CIECAM02), where the mapping in performed between the source and destination gamut boundary descriptors. The transformed image is then converted from the device-independent color appearance space into the output device-dependent space (304 and 305). The foregoing process will now be described in more detail.

Figure 5:
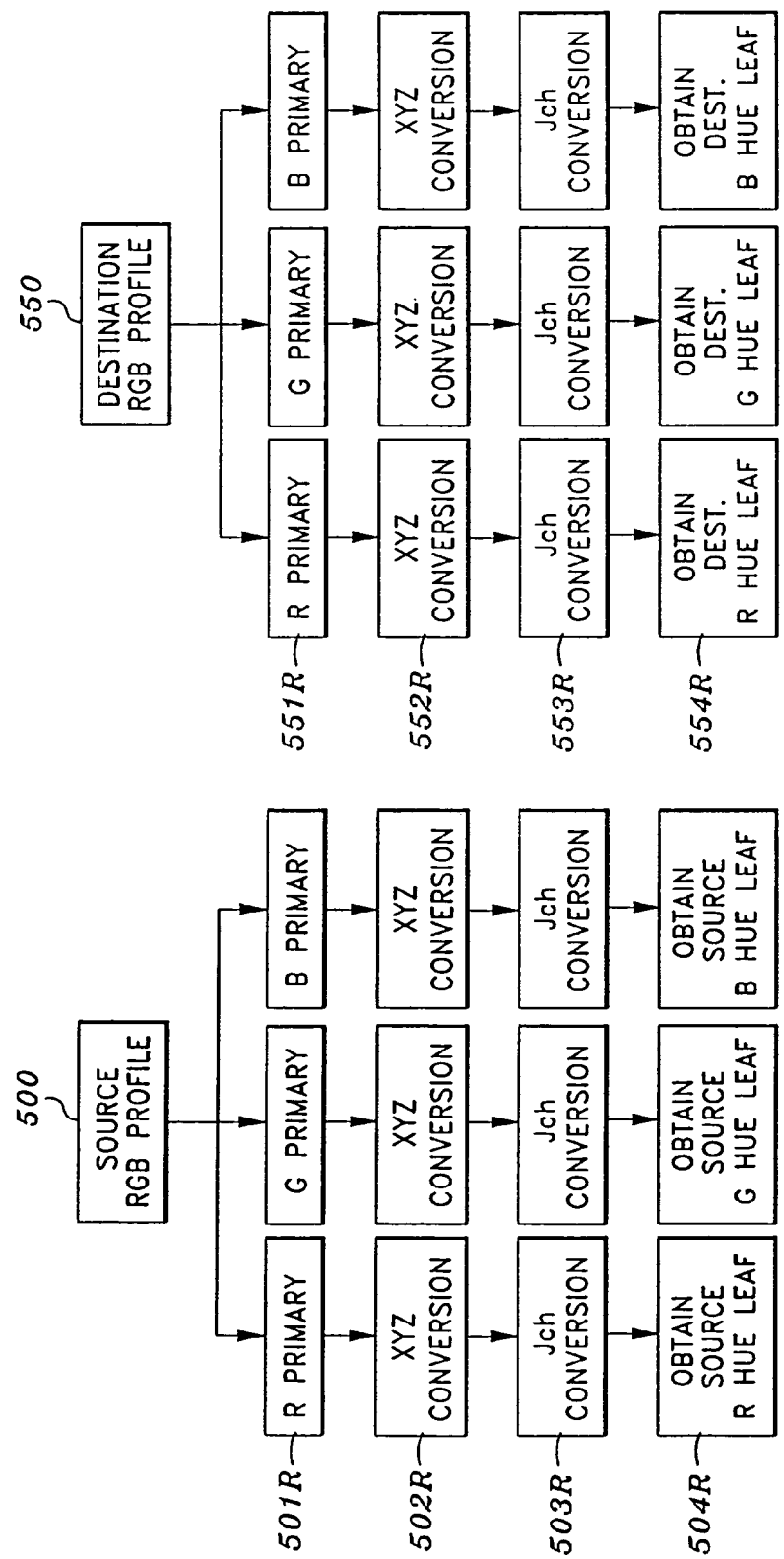
FIGS. 5A and 5B depict a process for obtaining primary hue leaves for a source and destination gamut according to the invention.
Figure 6:
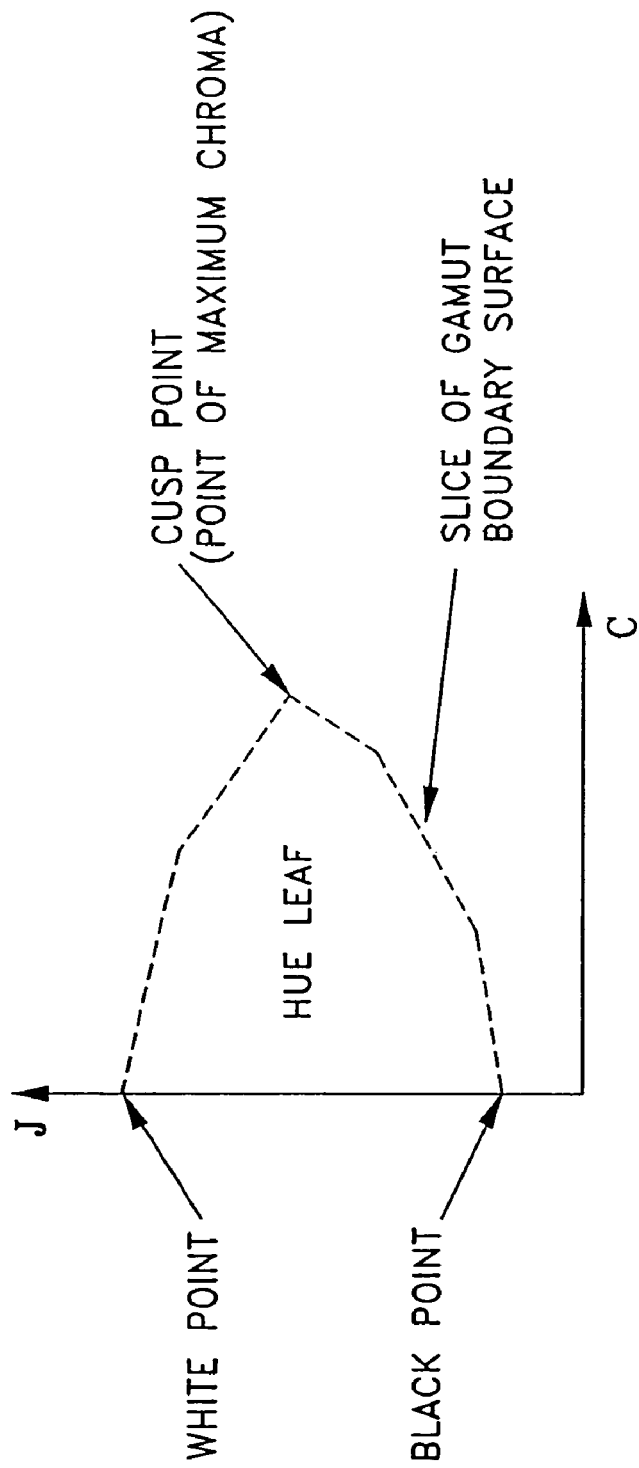
FIG. 6 depicts an example of a hue leaf obtained by the process of FIG. 5A or 5B.

In one embodiment of the invention, primary color separation is performed and the mapping is performed utilizing primary color hue leafs for each of the source and destination devices. Referring to FIGS. 5A and 5B, a process is depicted for obtaining primary color hue leafs for both a source and a destination device. As seen in FIG. 5A, the primary colors (R (red), G (green), and B (blue)) are obtained from the source profile 500. Each primary color is processed separately but in a like manner to obtain a source hue leaf for the corresponding primary. Accordingly, for brevity, only the processing of the red primary will be described herein, but like processing is performed on each of the green and blue primaries. Thus, with respect to the red primary, tristimulus values (XYZ values) are determined for the red primary (501R) and the tristimulus values are converted into device-independent color appearance space (e.g., Jch) values (502R). In one embodiment, the device-independent color appearance space is CIECAM02, which utilizes Jch values (where J=lightness, c=chroma, and h=hue). From the Jch values, a hue angle (h) can be obtained for the primary and a corresponding hue leaf can be obtained (504R) by taking a slice of the source device's gamut at the primary hue angle. As stated above, the same process is performed for each of the green and blue primary colors to obtain corresponding green and blue hue leafs for the source. The same process is also performed for the destination so as to obtain corresponding primary hue leafs for the destination. The foregoing processes result in six primary hue leafs as follows: (1) Red primary source hue leaf, (2) Red primary destination hue leaf, (3) Green primary source hue leaf, (4) Green primary destination hue leaf, (5) Blue primary source hue leaf, (6) Blue primary destination hue leaf. It should be noted that a hue leaf is simply a slice through the gamut boundary surface at a known hue angle (h) (see FIG. 3), thereby producing a lightness vs. chroma profile (hue leaf) at the hue angle (h). An example of a hue leaf is depicted in FIG. 6. As seen in FIG. 6, the hue leaf is generally a series of straight lines that define the gamut boundary at the hue angle, where the highest point along the lightness (J) axis is the white point and the lowest point along the lightness axis corresponds to the black point. Additionally, the point of highest chroma (c) along the hue leaf profile corresponds to the hue leaf's cusp point. After the primary hue leafs have been obtained for both the source and destination devices, an input image is processed as shown in FIG. 7.

Figure 7:
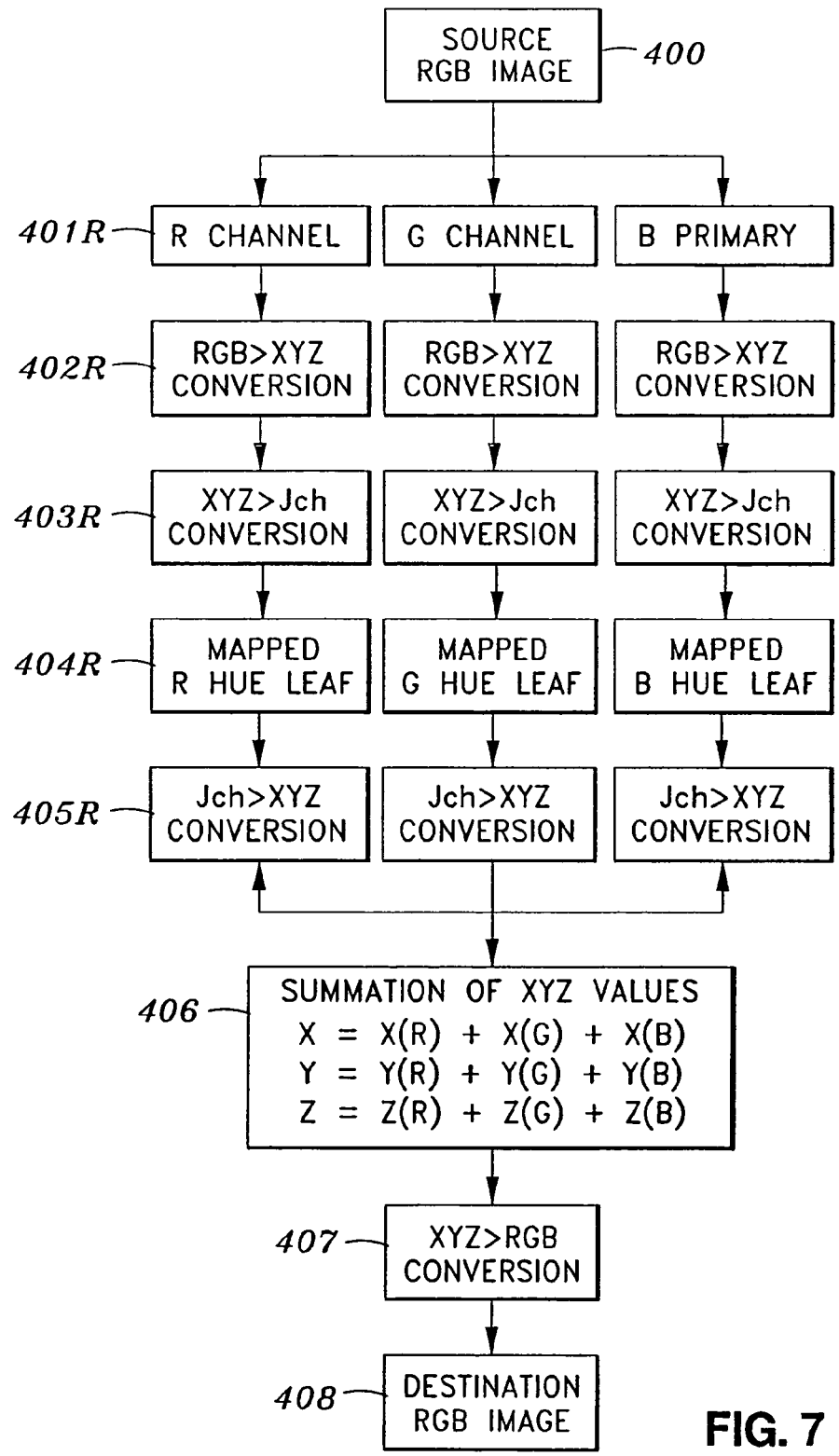
FIG. 7 depicts a process for RGB component mapping of a source image to a destination image according to the invention.

In FIG. 7, a source image 400, and more specifically, each pixel of the source image, is separated into its primary (Red, Green and Blue) color components (401R, 401G, and 401B). Each of the RGB channels is processed separately, but in like manner, whereby tristimulus values (XYZ values) are obtained for each primary component (402R, 402G, and 402B). The obtained XYZ values for each primary component are then converted into device-independent color appearance space values (Jch for CIECAM02, for example) (403R, 403G and 403B). After the Jch values have been obtained for each primary channel, each primary component is mapped (404R, 404G, and 404B) utilizing the above-described source and destination primary hue leafs (see FIGS. 5A and 5B). The mapping process will now be described in more detail.

The present invention preferably maps the cusp points of the two primary hue leaves to one another and utilizes a shear technique to map the remainder of the source primary hue leaf to the destination primary hue leaf. This process is unlike many conventional techniques in which the mapping is performed by scaling at a constant lightness value, by scaling at a constant chroma value, or by scaling equally relative to both lightness and chroma. The cusp-to-cusp mapping and shear mapping process will now be described with regard to FIGS. 8A, 8B, 9A, 9B and 10.

Figure 8A:
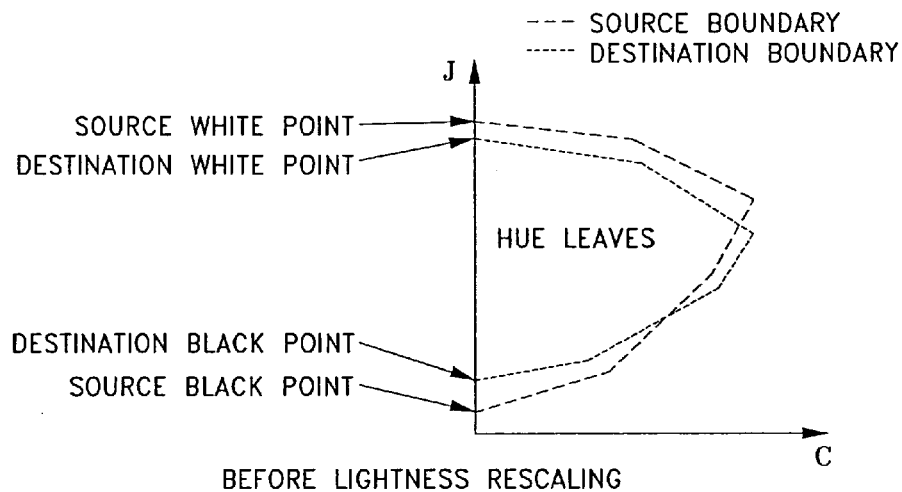
FIGS. 8A and 8B depict a lightness rescaling process for mapping a source hue leaf to a destination hue leaf.
Figure 8B:
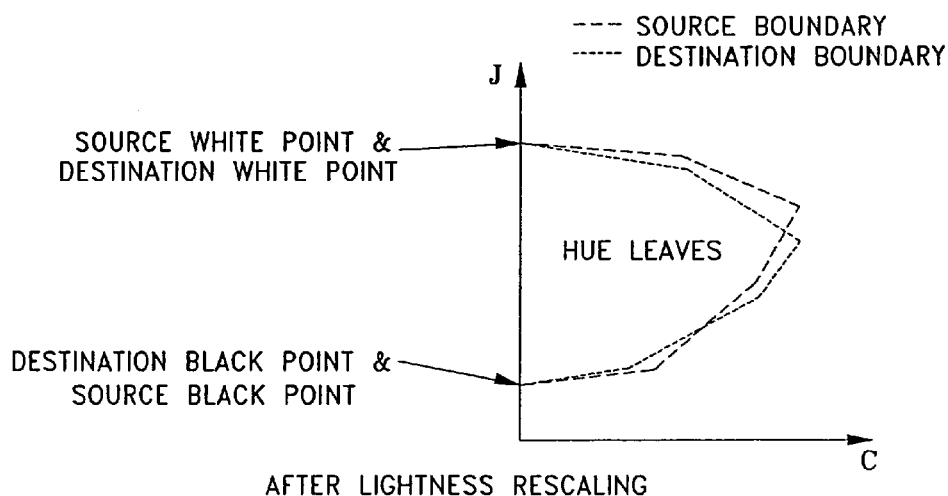

The first step in mapping the leaves is to perform a lightness rescaling. This process is depicted in FIGS. 8A and 8B. As seen in FIG. 8A, the white and black points of the source and destination hue leaves generally do not coincide. Therefore, the white point of the source hue leaf is scaled along the lightness (J) axis to coincide with the white point of the destination hue leaf, and the black point of the source hue leaf is scaled along the lightness (J) axis to coincide with the black point of the destination hue leaf. The result of this lightness rescaling is depicted in FIG. 8B.

Figure 9A:
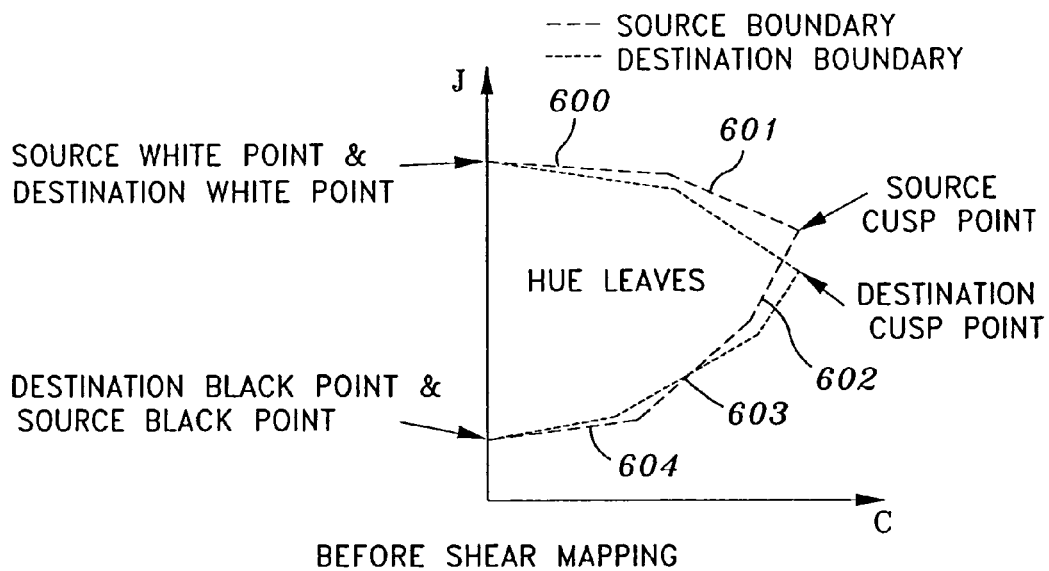
FIGS. 9A and 9B depict a shear mapping process that maps cusp points between a source hue leaf and a destination hue leaf.
Figure 9B:
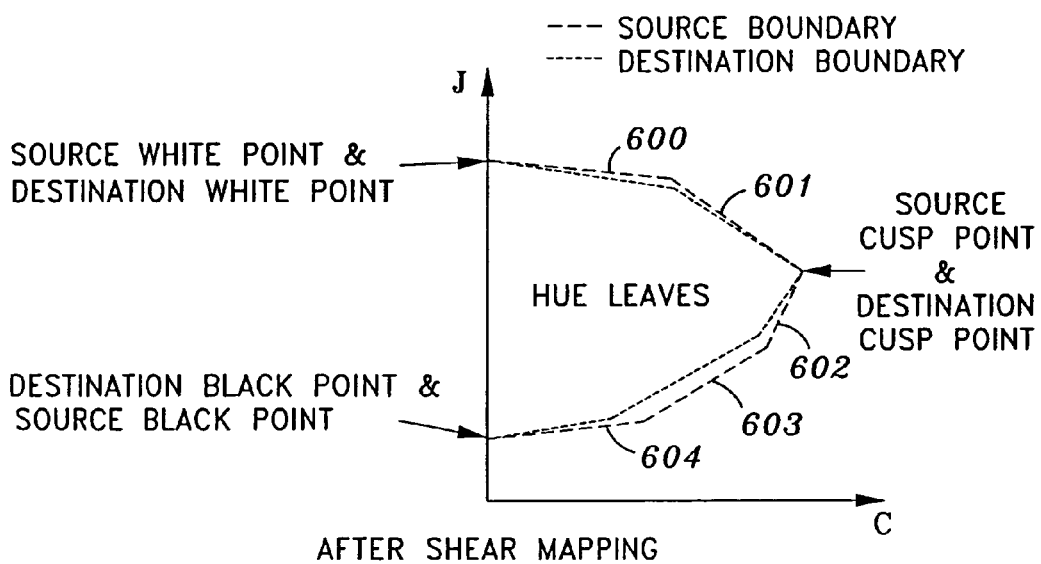
Figure 10:
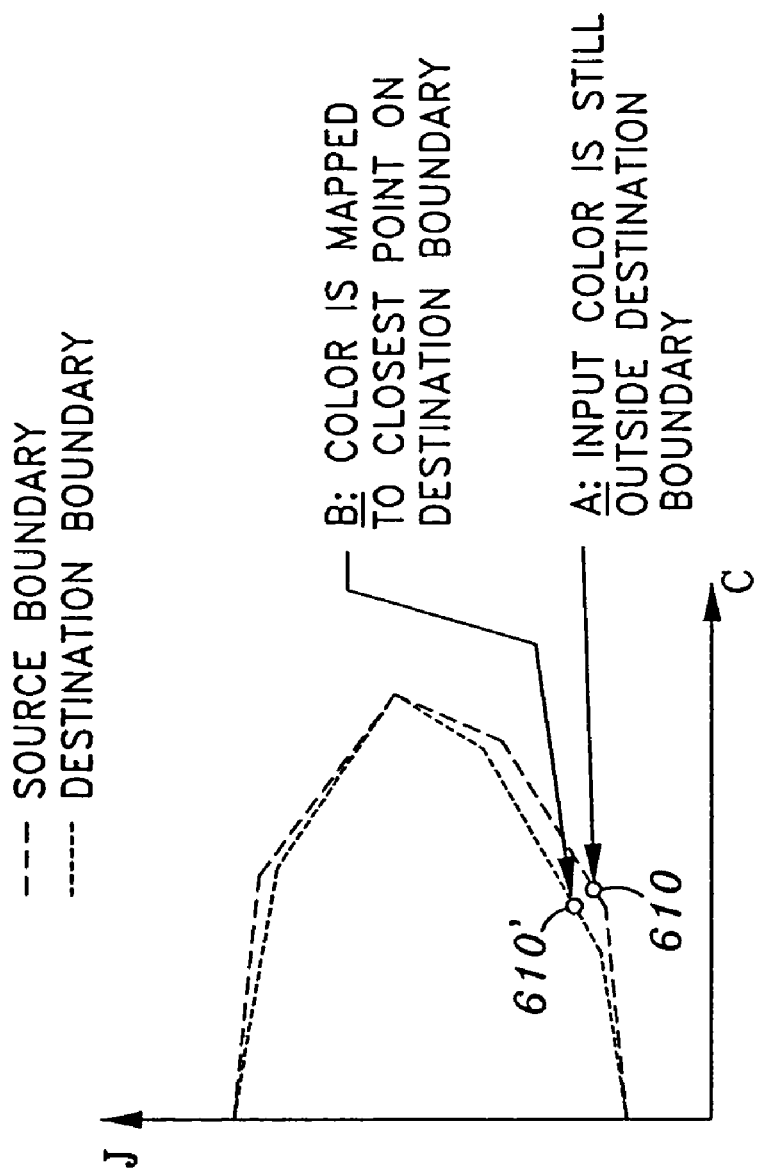
FIG. 10 depicts a minimum distance clipping process to fit source out-of-gamut points within a destination hue leaf.

After the lightness rescaling, the cusp point of the source hue leaf is adjusted to coincide with the cusp point of the destination hue leaf (see FIGS. 9A and 9B). This cusp-to-cusp matching is performed in a shear process as follows. The hue leaf can be considered as a series of straight lines (601 to 604) that intersect one another. The white point and black point are considered fixed hinges along the lightness (J) axis. By moving the cusp point of the source leaf to the cusp point location of the destination leaf (FIG. 9B), each straight line portion (601' to 604') and intersection point are scaled proportional to the relocation of the source cusp point. Thus, as seen in FIG. 9B, after the lightness rescaling and shear mapping, three points of each hue leaf coincide with one another; the white point, the black point, and the cusp point. Any remaining portion of the source hue leaf that is outside of the destination hue leaf is then mapped using a minimum delta clipping process (see FIG. 10). As seen in FIG. 10, a point 610 on the source hue leaf is shifted to the closest point on the destination hue leaf 610' by finding the minimum distance between the two leafs. This clipping process is performed for all points of the source hue leaf that remain outside of the destination hue leaf.

Returning now to FIG. 7, once the hue leaves have been mapped (404R, 404G, and 404B), the resultant mapping for each primary component is converted from the device-independent color appearance space (Jch values) back to tristimulus values (XYZ values) (405R, 405G and 405 B). The XYZ values for each primary channel (i.e., X(Red), X(Green), X(Blue), Y(Red), Y(Green), Y(Blue), Z(Red), Z(Green), Z(Blue)) are then summed (406) to obtain a resultant XYZ value for the color, which is then converted from XYZ back to RGB (407). Thus, the destination image is obtained (408).

Another embodiment of the invention will now be described in which gamut-mapping is performed utilizing hue rotation. Briefly, hue rotation refers to a process whereby the hue angle of any given color in the source is determined relative to the nearest primary and secondary colors so that a relative hue angle for obtaining a destination hue leaf from the destination gamut can be determined. That is, the hue angle of any color in a hue wheel of the source gamut is determined as a percentage of its distance between two known colors, one of which is a primary color and the other a secondary color. After determining the relative location of the color in the source hue wheel, the same relative position between the same two corresponding known colors in the destination hue wheel is determined so that the hue angle for obtaining a hue leaf from the destination gamut can be determined. Once the hue angle in the destination has been determined, the source and destination hue leafs are obtained and the mapping is performed.

Figure 11:
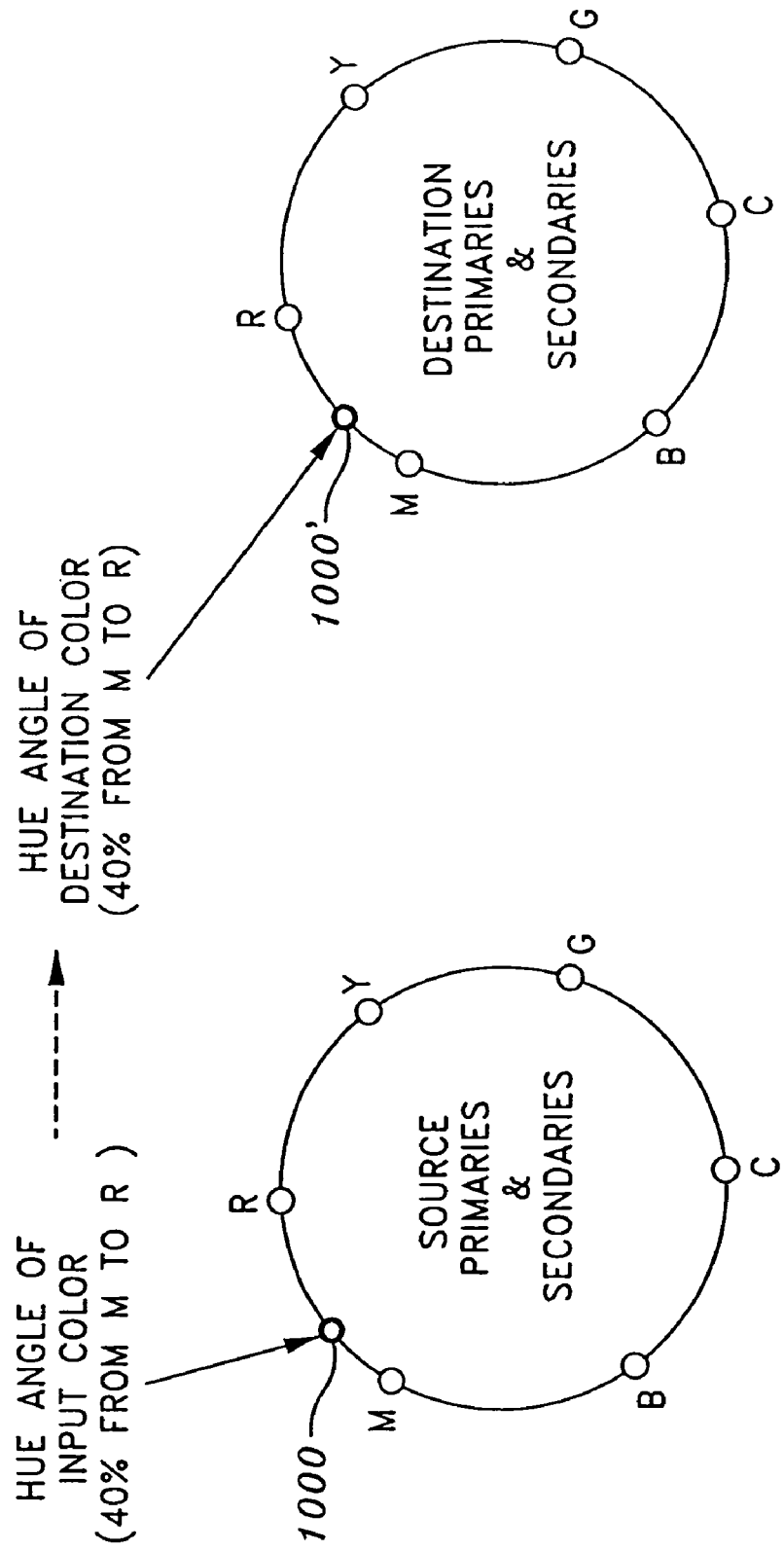
FIGS. 11A and 11B depict source and destination hue wheels, respectively, for performing a hue rotation process according to the invention
Figure 12:
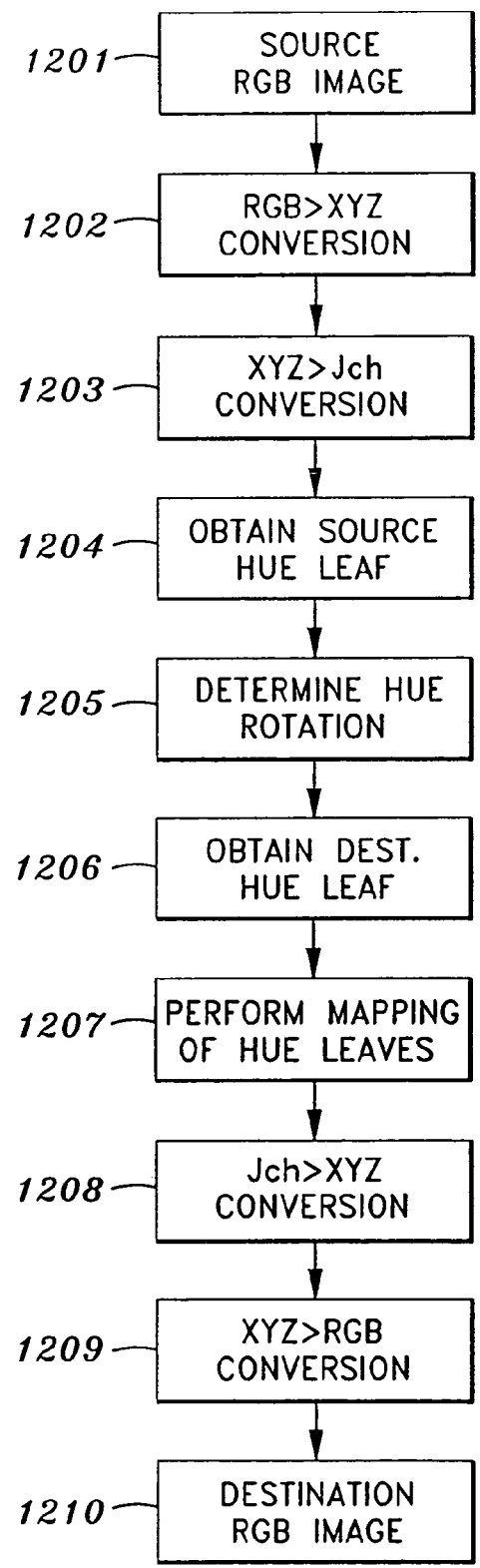
FIG. 12 is a flowchart for performing a hue rotation mapping process according to the invention.

Referring to FIGS. 11A and 11B, prior to performing the mapping process, source and destination hue wheels are obtained for performing the hue rotation process according to the invention. The source hue wheel is obtained from the source gamut, while the destination hue wheel is obtained from the destination gamut. That is, knowing the source and destination gamuts, the hue angles for each of the primary colors (Red, Green and Blue) and the hue angles for each of the secondary colors (Cyan, Magenta and Yellow) for both the source and destination gamuts can be determined. Utilizing these hue angles, corresponding source and destination hue wheels (FIGS. 11A and 11B, for example) can be obtained. Once the source and destination hue wheels have been obtained, any input color can be mapped as shown in FIG. 12.

In performing the mapping, the source image 1201 is obtained and the RGB values of the input color are converted to tristimulus values (XYZ values) (step 1202). The tristimulus values (XYZ values) are then converted into device-independent color appearance space values (step 1203), which may be, for example, Jch values in the CIECAM02 color space. Knowing the hue angle of the input color in the source gamut, a source hue leaf can be obtained at the angle (h) (step 1204). Next, a hue rotation process (step 1205) is performed to obtain the destination hue leaf and the hue rotation process will now be described in more detail.

In performing hue rotation, the hue wheels of FIGS. 11A and 11B are utilized. In FIG. 11A, the hue angle of each primary and secondary color are known and these angles are used as part of a hue rotation calculation. As an initial step in the hue rotation calculation, the relative position of the input color between the nearest primary and secondary color is determined. For example, from the source hue wheel, it is known that the hue angle of the red primary (R)=355 degrees and that the hue angle of the magenta secondary (M)=295 degrees. It is also known that the input color 1000 falls somewhere between R (red primary) and M (magenta secondary). The location of the input color relative to these two colors is determined and in the example of FIG. 11A, the input color is determined to lie at a point 40% of the distance between the magenta (M) and red (R) colors. Thus, it can be determined that the hue angle of the input color is 310 degrees. Normally, without performing hue rotation, a destination hue leaf would be obtained from both the source and the destination gamuts at the 310 degree hue angle. However, utilizing the hue rotation process of the present invention, the hue angle of the destination hue leaf may not necessarily correspond to the same hue angle of source hue leaf.

In this regard, the hue angle for obtaining the destination hue leaf is calculated based on the relative positioning of the input color. For example, since the location of the hue leaf in the source was determined to lie at 40% of the distance between the M and R colors, a corresponding location between the M and R colors in the destination hue wheel is determined. Thus, referring to FIG. 11B, it is known that the R color in the destination hue wheel lies at 346 degrees and that the M color lies at 290 degrees. Calculating a location for the destination hue leaf that lies at 40% of the distance (14 degrees) between the destination R and M colors results in the destination hue angle being 304 degrees. Thus, the destination hue leaf is obtained (step 1206) from the destination gamut at 304 degrees. The two hue leafs (310 degrees for the source and 304 degrees for the destination) are then mapped (step 1207) utilizing, for example, the above-described lightness resealing, shear mapping and clipping processes. The result of the mapping is then converted from the device-independent color appearance space (Jch, for example)(step 1208) back to tristimulus values (XYZ values), and the tristimulus values (XYZ values) are converted back to RGB values (step 1209), so that the destination image is obtained (1210).

In another aspect of the invention, the mapping process utilized is a cusp point mapping rather than a hue leaf mapping, and any final clipping process is performed by mapping the source point to the three-dimensional gamut boundary of the destination gamut after mapping the cusp points. This process will now be described in more detail with regard to FIGS. 13A and 13B.

Figure 13A:
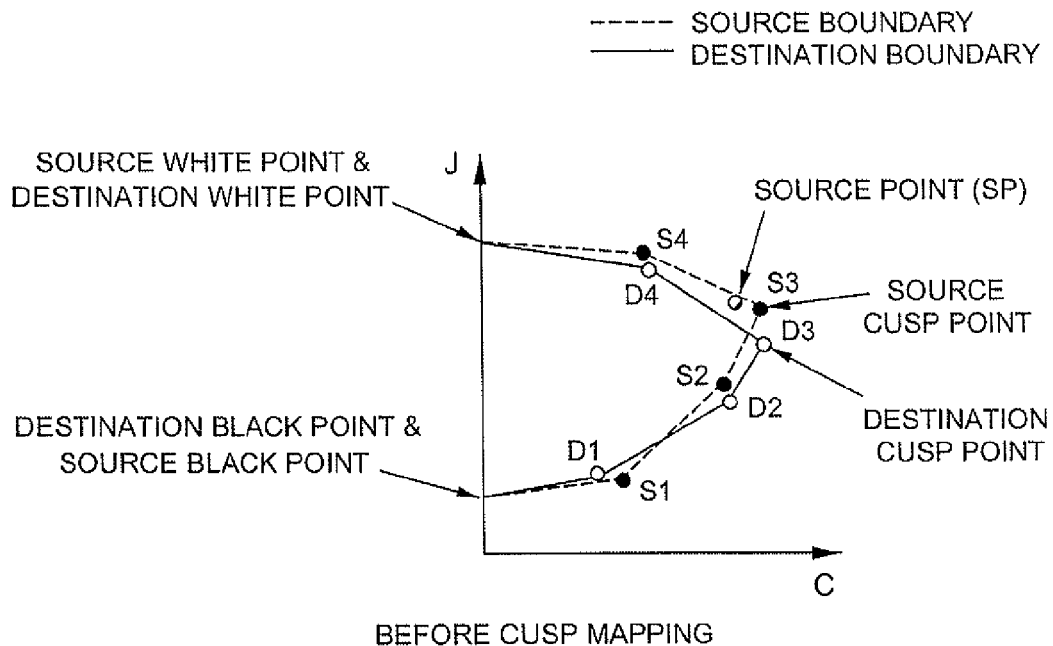
FIGS. 13A and 13B depict a cusp point mapping process for mapping a source cusp point to a destination cusp point according to the invention.
Figure 13B:
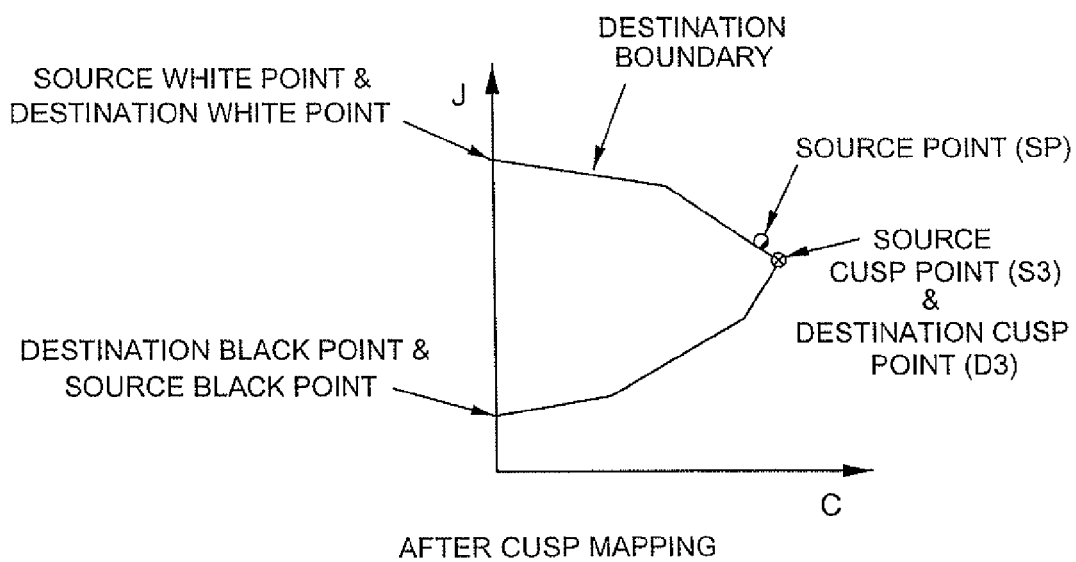

Referring to FIGS. 13A and 13B, depicted therein is a cusp point mapping process for mapping a source cusp point to a destination cusp point according to the invention. According to the cusp point mapping process of the invention, once the source and destination hue angles have been obtained as described above (i.e., either with or without hue rotation), a source cusp point at the source hue angle and a destination cusp point at the destination hue angle are located. It should be noted that the source cusp point and the destination cusp point to be located each represent a point on the gamut surface with the highest chroma value. That is, the source cusp point represents the point with the maximum chroma value at the source hue angle, while the destination cusp point represents the point with the maximum chroma value at the destination hue angle. In locating the source and destination cusp points, each intersecting point on the gamut boundary may be analyzed to determine its chroma. For instance, as seen in FIG. 13A, at the source hue angle, intersecting points S1, S2, S3 and S4 are present. Each of these points is analyzed to determine its respective chroma value and the point with the highest chroma (S3 as seen in FIG. 13A) is determined as the source cusp point. Likewise, at the destination hue angle, intersecting points D1, D2, D3 and D4 are present. Each of these points is analyzed to determine its respective chroma value and the point with the highest chroma (D3 as seen in FIG. 13A) is determined as the destination cusp point. Once the source and destination cusp points have been located, the other (intersecting) points can be ignored or discarded. Of course, other techniques could be utilized to determine the point with the highest chroma so as to determine the cusp points and the invention is not limited to the foregoing process.

Once the source and destination cusp points are located (S3 and D3 in FIG. 13A), the source cusp point is mapped to the destination cusp point. The mapping according the invention is preferably a shear mapping process and the process described above with regard to FIGS. 9A and 9B for shear mapping the cusp points is equally applicable here. Thus, as seen in FIG. 13B, the source cusp point (S3) is shear mapped to coincide with the destination cusp point (D3), and the source point (Sp) is proportionally shear mapped to the location shown in FIG. 13B.

As seen in FIG. 13B, source point Sp, after the shear mapping of the cusp points, is still slightly out-of-gamut in that it still lies slightly outside of the boundary surface of the destination gamut. Therefore, to complete the mapping of the source point Sp, a final clipping is performed to map the source point to the three-dimensional gamut boundary surface of the destination gamut. This process can simply be determining the shortest distance from the source point to the gamut boundary and mapping the point to surface.

Figure 14:
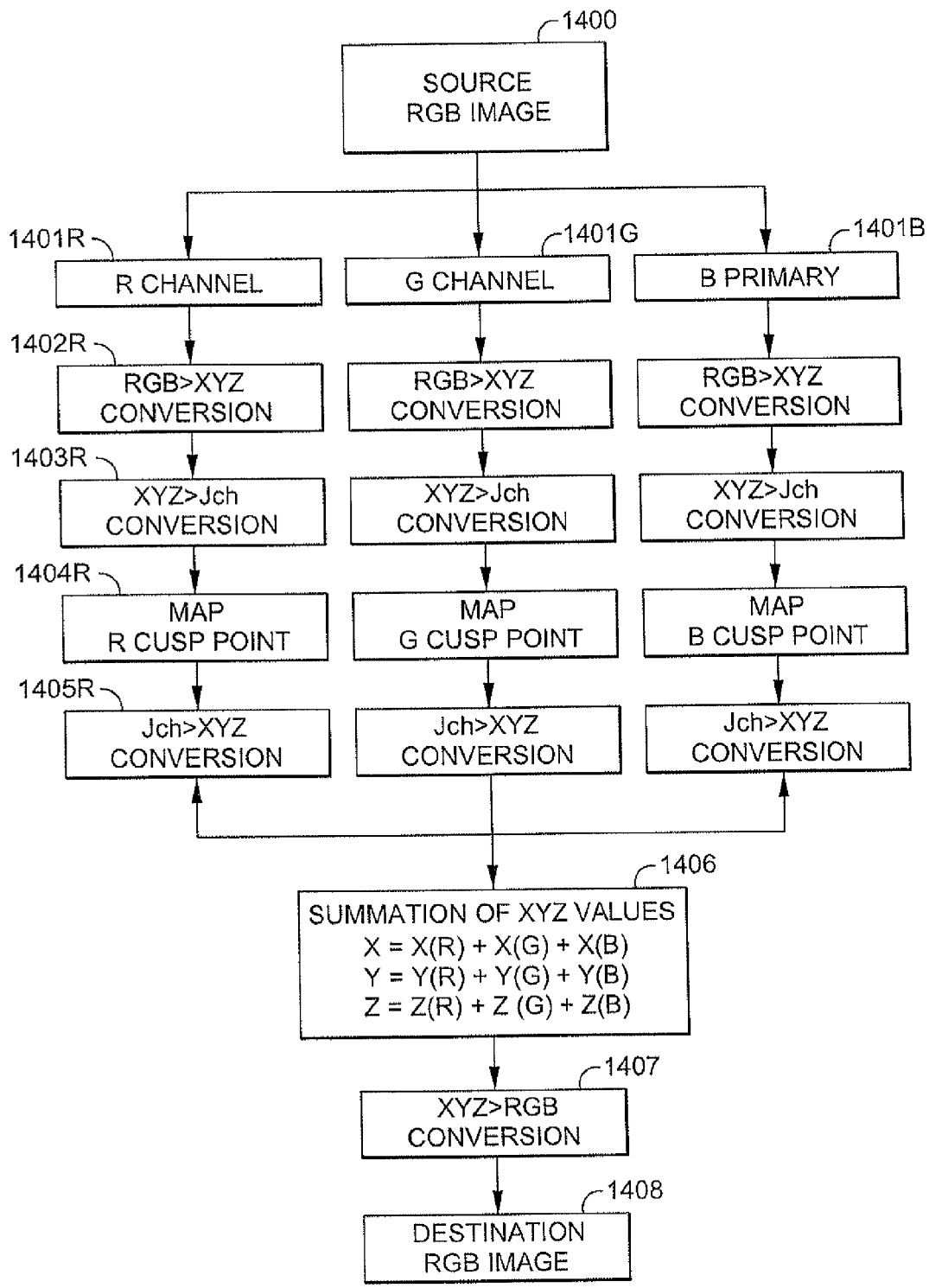
FIG. 14 depicts a process for RGB component mapping of a source image to a destination image utilizing the cusp point mapping process of the invention.

As can readily be seen, the foregoing cusp point mapping process can be utilized in place of the hue leaf mapping process described above. Therefore, the foregoing primary color separation process can be performed with the cusp point mapping, and the foregoing hue rotation process can be performed with the cusp point mapping. The primary color separation process utilizing the cusp point mapping is depicted in FIG. 14, and the processing of each step in FIG. 14 is similar to that as described above with regard to FIG. 7. Thus, in FIG. 14, a source image 1400, and more specifically, each pixel of the source image, is separated into its primary (Red, Green and Blue) color components (1401R, 1401G, and 1401B). Each of the RGB channels is processed separately, but in like manner, whereby tristimulus values (XYZ values) are obtained for each primary component (1402R, 1402G, and 1402B). The obtained XYZ values for each primary component are then converted into device-independent color appearance space values (Jch for CIECAM02, for example) (1403R, 1403G and 1403B). After the Jch values have been obtained for each primary channel, each primary component is mapped (1404R, 1404G, and 1404B) utilizing the above-described cusp point mapping. The resultant mapping for each primary component is converted from the device-independent color appearance space (Jch values) back to tristimulus values (XYZ values) (1405R, 1405G and 1405 B). The XYZ values for each primary channel (i.e., X(Red), X(Green), X(Blue), Y(Red), Y(Green), Y(Blue), Z(Red), Z(Green), Z(Blue)) are then summed (1406) to obtain a resultant XYZ value for the color, which is then converted from XYZ back to RGB (1407). Thus, the destination image is obtained (1408).

Figure 15:
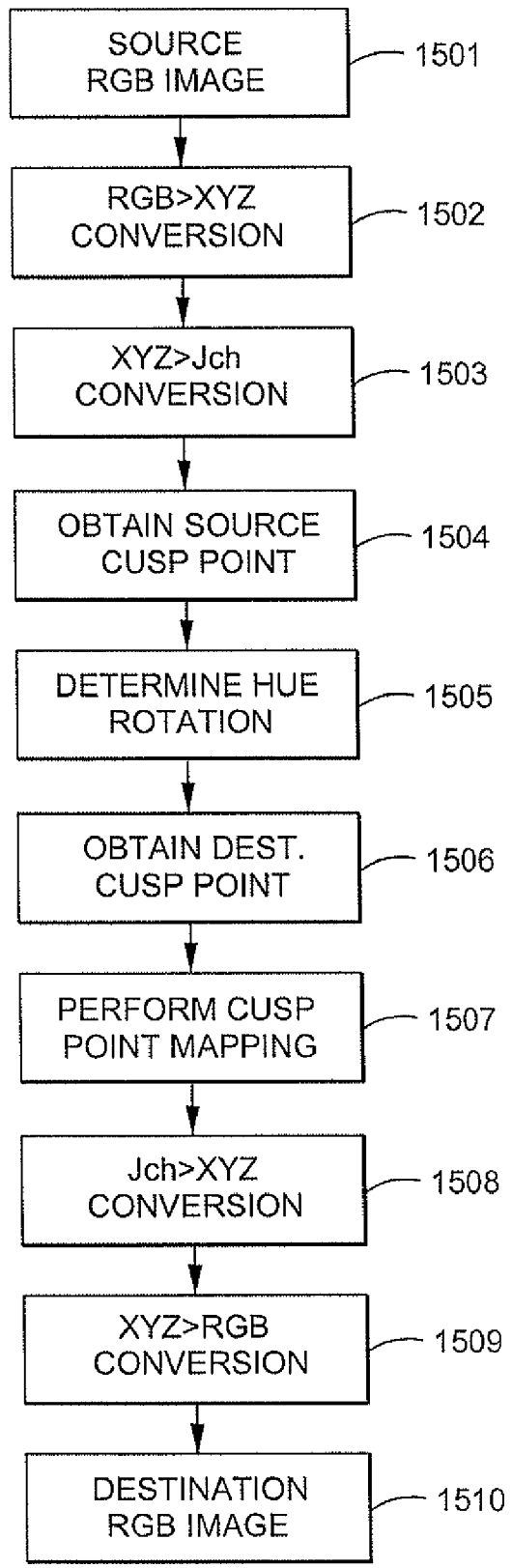
FIG. 15 is a flowchart depicting a process for performing a hue rotation mapping while utilizing the cusp point mapping process of the invention.

With regard to the hue rotation process utilizing the cusp mapping, FIG. 15 depicts a flowchart similar to FIG. 12 and the description of FIG. 12 applies equally for FIG. 15. Therefore, in performing the mapping, the source image 1501 is obtained and the RGB values of the input color are converted to tristimulus values (XYZ values) (step 1502). The tristimulus values (XYZ values) are then converted into device-independent color appearance space values (step 1503), which may be, for example, Jch values in the CIECAM02 color space. Knowing the hue angle of the input color in the source gamut, a source cusp point can be obtained at the angle (h) (step 1504). Next, the hue rotation process is performed (step 1505) to determine the destination hue angle and to obtain the destination cusp point (step S1506). The hue rotation process of step S1505 is the same as that described above and once the destination hue angle has been obtained, the destination cusp point can be obtained as described above with regard to FIGS. 13A and 13B. Then, the cusp points are mapped (step S1507) as described above with regard to FIGS. 13A and 13B. The result of the mapping is then converted from the device-independent color appearance space (Jch, for example)(step 1508) back to tristimulus values (XYZ values), and the tristimulus values (XYZ values) are converted back to RGB values (step 1509), so that the destination image is obtained (1510).

As is well known in the art, the foregoing gamut mapping processes of primary component separation and processing, and hue rotation processing can be implemented via computer-executable process steps that form part of a color management application program. The process steps can be implemented when converting an image displayed on a source device (such as a color monitor that utilizes the Adobe RGB color space) so that the source image can be output by an output device (such as a color monitor that utilizes the sRGB color space). Moreover, those skilled in the art can readily recognize that the gamut mapping process of the present invention may be implemented to convert a source image (whether input via a scanner, displayed on a monitor, etc.) so that the image can be output and printed by a printer. Thus, the invention may be realized by the computer-executable process steps which form the color management program, a computer-readable storage medium, such as a CD-ROM, magnetic disk, floppy disk, etc., on which the process steps are stored, or a computer apparatus that executes the process steps of the color management application.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of performing gamut-mapping of a source point for a source device to a destination point for a destination device in a perceptually linear color space, comprising:
   a computer processor executing a computer program to perform the steps of:
   separating the source point into primary color components (Red, Green, Blue);
   determining tristimulus values for each of the separated primary color components, and converting the tristimulus values for each primary color component into respective device-independent color appearance space values;
   for each primary color component, performing a mapping process comprising the steps of:
   determining a source hue angle and a destination hue angle for the source point;
   obtaining a source cusp point representing a maximum chroma value on a source gamut boundary surface at the source hue angle, and obtaining a destination cusp point representing a maximum chroma value on a destination gamut boundary surface at the destination hue angle;
   performing a cusp mapping process to map the source gamut boundary surface at the source hue angle so that the source cusp point coincides with the destination cusp point; and
   if after the cusp mapping process, the source point lies outside of the destination gamut boundary surface, mapping the source point to the destination gamut boundary surface;
   converting the mapped source point obtained as a result of the mapping process for each respective primary color component from device-independent color appearance space values to tristimulus values;
   summing respective tristimulus values for each primary color component to obtain a resultant tristimulus values; and
   converting the resultant tristimulus values to a color space of the destination device to obtain a destination image.

2. The method according to claim 1, wherein the perceptually linear color space is CIECAM02.

3. The method according to claim 1, wherein the device-independent color appearance space values are Jch values.

4. The method according to claim 1, wherein the cusp mapping process comprises performing a shear process to map the source gamut boundary surface so that the source cusp point coincides with the destination cusp point.

5. The method according to claim 4, further comprising, prior to performing the cusp mapping process, performing a lightness rescaling process to map source white and black points along a lightness axis to destination white and black points, respectively.

6. A method of performing gamut-mapping of a source point for a source device to a destination point of a destination device in a perceptually linear color space, comprising:
   a computer processor executing a computer program to perform the steps of:
   obtaining the source point for a source image;
   determining tristimulus values for the source point and converting the tristimulus values to device-independent color appearance space values;
   obtaining a source hue wheel and a destination hue wheel each respectively comprising known hue angles for each of primary (Red, Green, Blue) and secondary (Cyan, Magenta, Yellow) color components of their respective gamuts;

determining a source hue angle of the source point in the source hue wheel, and determining a source relative position of the source point in the source hue wheel between the nearest primary color and the nearest secondary color;

determining, in the destination hue wheel, a corresponding relative position between the primary and secondary color corresponding to the nearest primary and secondary in the source hue wheel, the determined relative position in the destination hue wheel resulting in a destination hue angle;

obtaining a source cusp point representing a maximum chroma value on a source gamut boundary surface at the source hue angle, and obtaining a destination cusp point representing a maximum chroma value on a destination gamut boundary surface at the destination hue angle;

performing a cusp mapping process to map the source gamut boundary surface at the source hue angle so that the source cusp point coincides with the destination cusp point;

if after the cusp mapping process, the source point lies outside of the destination gamut boundary surface, mapping the source point to the destination gamut boundary surface; and converting the mapped source point obtained as a result of the mapping process from device-independent color appearance space values to tristimulus values, and converting the convened tristimulus values to a color space of the destination device.

7. The method according to claim 6, wherein the cusp mapping process comprises performing a shear process to map the source gamut boundary surface so that the source cusp point coincides with the destination cusp point.

8. The method according to claim 7, further comprising, prior to performing the cusp mapping process, performing a lightness rescaling process to map source white and black points along a lightness axis to destination white and black points, respectively.

9. A computer-readable storage medium on which is stored a computer program for performing gamut-mapping of a source point for a source device to a destination point of a destination device in a perceptually linear color space, the program comprising computer executable code to perform the steps of:

separating the source point into primary color components (Red, Green, Blue);

determining tristimulus values for each of the separated primary color components, and converting the tristimulus values for each primary color component into respective device-independent color appearance space values;

for each primary color component, performing a mapping process comprising the steps of:

determining a source hue angle and a destination hue angle for the source point;

obtaining a source cusp point representing a maximum chroma value on a source gamut boundary surface at the source hue angle, and obtaining a destination cusp point representing a maximum chroma value on a destination gamut boundary surface at the destination hue angle;

performing a cusp mapping process to map the source gamut boundary surface at the source hue angle so that the source cusp point coincides with the destination cusp point; and if after the cusp mapping process, the source point lies outside of the destination gamut boundary surface, mapping the source point to the destination gamut boundary surface;

converting the mapped source point obtained as a result of the mapping process for each respective primary color component from device-independent color appearance space values to tristimulus values;

summing respective tristimulus values for each primary color component to obtain a resultant tristimulus values; and converting the resultant tristimulus values to a color space of the destination device to obtain a destination image.

10. The computer readable storage medium according to claim 9, wherein the perceptually linear color space is CIECAM02.

11. The computer readable storage medium according to claim 9, wherein the device-independent color appearance space values are Jch values.

12. The computer readable storage medium according to claim 9, wherein the cusp mapping process comprises performing a shear process to map the source gamut boundary surface so that the source cusp point coincides with the destination cusp point.

13. The computer readable storage medium according to claim 12, further comprising, prior to performing the cusp mapping process, performing a lightness rescaling process to map source white and black points along a lightness axis to destination white and black points, respectively.

14. A computer-readable storage medium on which is stored a computer program for performing gamut-mapping of a source point for a source device to a destination point for a destination device in a perceptually linear color space, the program comprising computer executable code for performing the steps of:

obtaining the source point for a source image;

determining tristimulus values for the source point and converting the tristimulus values to device-independent color appearance space values;

obtaining a source hue wheel and a destination hue wheel each respectively comprising known hue angles for each of primary (Red, Green, Blue) and secondary (Cyan, Magenta, Yellow) color components of their respective gamuts;

determining a source hue angle of the source point in the source hue wheel, and determining a source relative position of the source point in the source hue wheel between the nearest primary color and the nearest secondary color;

determining, in the destination hue wheel, a corresponding relative position between the primary and secondary color corresponding to the nearest primary and secondary in the source hue wheel, the determined relative position in the destination hue wheel resulting in a destination hue angle;

obtaining a source cusp point representing a maximum chroma value on a source gamut boundary surface at the source hue angle, and obtaining a destination cusp point representing a maximum chroma value on a destination gamut boundary surface at the destination hue angle;

performing a cusp mapping process to map the source gamut boundary surface at the source hue angle so that the source cusp point coincides with the destination cusp point;

if after the cusp mapping process, the source point lies outside of the destination gamut boundary surface, mapping the source point to the destination gamut boundary surface; and converting the mapped source point obtained as a result of the mapping process from device-independent color appearance space values to tristimulus values, and converting the converted tristimulus values to a color space of the destination device.

15. The computer readable storage medium according to claim 14, wherein the cusp mapping process comprises performing a shear process to map the source gamut boundary surface so that the source cusp point coincides with the destination cusp point.

16. The computer readable storage medium according to claim 15, further comprising, prior to performing the cusp mapping process, performing a lightness rescaling process to map source white and black points along a lightness axis to destination white and black points, respectively.

17. An apparatus for performing gamut-mapping of a source point for a source device to a destination point for a destination device in a perceptually linear color space, comprising:

a processor for executing computer-executable code; and a memory that stores a computer program comprised of computer-executable code that, when executed by the processor, performs the steps of:

separating the source point into primary color components (Red, Green, Blue);

determining tristimulus values for each of the separated primary color components, and converting the tristimulus values for each primary color component into respective device-independent color appearance space values;

for each primary color component, performing a mapping process comprising the steps of:

determining a source hue angle and a destination hue angle for the source point;

obtaining a source cusp point representing a maximum chroma value on a source gamut boundary surface at the source hue angle, and obtaining a destination cusp point representing a maximum chroma value on a destination gamut boundary surface at the destination hue angle;

performing a cusp mapping process to map the source boundary gamut surface at the source hue angle so that the source cusp point coincides with the destination cusp point; and if after the cusp mapping process, the source point lies outside of the destination gamut boundary surface, mapping the source point to the destination gamut boundary surface;

converting the mapped source point obtained as a result of the mapping process for each respective primary color component from device-independent color appearance space values to tristimulus values;

summing respective tristimulus values for each primary color component to obtain a resultant tristimulus values; and converting the resultant tristimulus values to a color space of the destination device to obtain a destination image.

18. An apparatus for performing gamut-mapping of a source point for a source device to a destination point for a destination device in a perceptually linear color space, comprising:

a processor for executing computer-executable code; and a memory that stores a computer-executable comprised of computer-executable code that, when executed by the processor, performs the steps of:

obtaining the source point for a source image;

determining tristimulus values for the source point and converting the tristimulus values to device-independent color appearance space values;

obtaining a source hue wheel and a destination hue wheel each respectively comprising known hue angles for each of primary (Red, Green, Blue) and secondary (Cyan, Magenta, Yellow) color components of their respective gamuts;

determining a source hue angle of the source point in the source hue wheel, and determining a source relative position of the source point in the source hue wheel between the nearest primary color and the nearest secondary color;

determining, in the destination hue wheel, a corresponding relative position between the primary and secondary color corresponding to the nearest primary and secondary in the source hue wheel, the determined relative position in the destination hue wheel resulting in a destination hue angle;

obtaining a source cusp point representing a maximum chroma value on a source gamut boundary surface at the source hue angle, and obtaining a destination cusp point representing a maximum chroma value on a destination gamut boundary surface at the destination hue angle;

performing a cusp mapping process to map the source gamut boundary surface at the source hue angle so that the source cusp point coincides with the destination cusp point;

if after the cusp mapping process, the source point lies outside of the destination gamut boundary surface, mapping the source point to the destination gamut boundary surface; and converting the mapped source point obtained as a result of the mapping process from device-independent color appearance space values to tristimulus values, and converting the convened tristimulus values to a color space of the destination device.

* * * * *

UNITED STATES PATENT AND TRADEMARK OFFICE
CERTIFICATE OF CORRECTION

| | | |
|---|---|---|
| PATENT NO. | : 7,663,641 B2 | Page 1 of 1 |
| APPLICATION NO. | : 11/396693 | |
| DATED | : February 16, 2010 | |
| INVENTOR(S) | : Rocklin J. Sloan | |

It is certified that error appears in the above-identified patent and that said Letters Patent is hereby corrected as shown below:

In column 13, line 31, in Claim 6, delete "convened" and insert -- converted --, therefor.

In column 16, line 51, in Claim 18, delete "convened" and insert -- converted --, therefor.

Signed and Sealed this
Fifteenth Day of February, 2011

David J. Kappos
*Director of the United States Patent and Trademark Office*